(12) United States Patent
Mahoney et al.

(10) Patent No.: US 8,580,461 B2
(45) Date of Patent: Nov. 12, 2013

(54) ANISOTROPIC COEFFICIENT OF THERMAL EXPANSION LANTHANUM STRONTIUM MANGANITE FOR SOLID OXIDE FUEL CELL CATHODE

(75) Inventors: F. Michael Mahoney, Holliston, MA (US); Yeshwanth Narendar, Westford, MA (US); Hansong Huang, Ashland, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 148 days.

(21) Appl. No.: 13/197,909

(22) Filed: Aug. 4, 2011

(65) Prior Publication Data
US 2012/0009505 A1  Jan. 12, 2012

Related U.S. Application Data

(62) Division of application No. 12/982,054, filed on Dec. 30, 2010.

(60) Provisional application No. 61/335,085, filed on Dec. 31, 2009.

(51) Int. Cl.
*H01M 4/02* (2006.01)

(52) U.S. Cl.
USPC ........... 429/528; 429/488; 429/489; 429/535; 264/346

(58) Field of Classification Search
USPC ................... 429/488, 489, 528, 535; 264/346
See application file for complete search history.

(56) References Cited

U.S. PATENT DOCUMENTS

2005/0019636 A1* 1/2005 Kwon et al. ............. 429/32

FOREIGN PATENT DOCUMENTS

| JP | 04303565 A | * 10/1992 |
|---|---|---|
| WO | 2012068297 A2 | 5/2012 |

OTHER PUBLICATIONS

Mori, Masashi. "Mechanisms of Thermal Expansion and Shrinkage of $La0.8Sr0.2MnO3+\delta$ Perovskites with Different Densities during Thermal Cycling in Air." Journal of the Electrochemical Socity, 152 (4) A732-A739 (2005).*

Meixner, D.L. et al., "Low-Temperature Plastic Deformation of a Perovskite Ceramic Material," Sod State Ionics, 146:285-300 (2002).

Mori, M., "Mechanisms of Thermal Expansion and Shrinkage of $La0.8Sr0. MnO3+8$ Perovskites with Different Densities During Thermal Cycling in Air," Journal of the Electrochemical Society, 152(4):A732-A739 (2005).

Mori, M. et al,, "Thermal-Expansion Behaviors and Mechanisms for Ca- or Sr-Soped Lanthanum Manganite Perovskites Under Oxidizing Atmospheres," Journal of the Electrochemical Society, 147(4): 1295-1302 (2000).

Neumeier, J.J. et al., "Thermal Expansion of Single-Crystalline $La0.83Sr0.17MnO3$: the Importance of Temperature-Induced Strain for Electrical Resistivity," Physical review B, vol. 58, No. 3, 1701-1705 (1999).

(Continued)

*Primary Examiner* — Zachary Best

(74) *Attorney, Agent, or Firm* — Robert N. Young; Abel Law Group, LLP

(57) ABSTRACT

An anisotropic coefficient of thermal expansion (CTE) cathode of a solid oxide fuel cell (SOFC) is formed by placing a layer of perovskite powder between two platens, and sintering the layer while applying pressure to the platens, thereby forming the anisotropic CTE cathode. The perovskite can be lanthanum strontium manganite (LSM).

21 Claims, 11 Drawing Sheets

(56) References Cited

OTHER PUBLICATIONS

Gaviko, et al., X-ray Studies of the (La,Sr)MnO3 Perovskite Manganite Structure, Physics of the solid state, vol. 47, No. 7, 1299-1305 (2005).

Iberl, A. et al., "High-Temperature X-ray Diffraction Measurements of Phase Transitions and Thermal Expansion in (La, Sr)(Mn Co)O3-Cathode Materials," Proceedings of the 2nd international symposium on solid oxide fuel cells, 527-535 (1991).

* cited by examiner

ANISOTROPIC COEFFICIENT OF THERMAL EXPANSION LANTHANUM STRONTIUM MANGANITE FOR SOLID OXIDE FUEL CELL CATHODE

CROSS-REFERENCE TO RELATED APPLICATIONS

This application is a divisional application of U.S. patent application Ser. No. 12/982,054, filed on Dec. 30, 2010, and claims the benefit of U.S. Provisional Application No. 61/335,085, filed on Dec. 31, 2009. The entire teachings of the above applications are incorporated herein by reference.

BACKGROUND

A fuel cell is a device that generates electricity by a chemical reaction. Typically, in a fuel cell, an oxygen gas, such as $O_2$, is reduced to oxygen ions ($O^{2-}$) at the cathode, and a fuel gas, such as $H_2$, is oxidized with the oxygen ions to form water at the anode. Among various types of fuel cells, solid oxide fuel cells (SOFCs) use hard ceramic compounds of metal oxides (e.g., calcium or zirconium oxides) to form components of the fuel cell, such as, for example, the anode, cathode, electrolyte, and interconnect. Fuel cells are generally designed as stacks, whereby subassemblies, each including a cathode, an anode and a solid electrolyte between the cathode and the anode, are assembled in series by locating an electrical interconnect between the cathode of one subassembly and the anode of another.

One SOFC cell design consists of five layers. Two of these five layers are relatively thick layers: anode bulk and cathode bulk. A relatively thin layer of electrolyte and relatively thin functional anode and cathode layers are sandwiched between the bulk layers. Typically, the thin layer thickness is only about $\frac{1}{100}^{th}$ of the bulk layer thickness. The most important mechanism in stress generation in a SOFC co-fired cell is the step of cooling down from the sintering temperature, typically 1300-1400° C., to room temperature, due to the mismatch in the coefficients of thermal expansion (CTE) between the materials of the five layers. Where there is sufficient mismatch of CTE among the layers, cooling, or any temperature change that is too rapid, can cause fracture and consequent failure of the SOFC. Because of the much larger thickness, the majority of the stress is generated by the mismatch between the CTEs of the anode bulk layer and the cathode bulk layer. Since most ceramics show linear elastic stress-strain behavior up to failure in the temperature range that a SOFC operates, for a fixed geometry design, there are only two material properties that affect the thermal mismatch stress: modulus and coefficient of thermal expansion of the materials.

In order to reduce the thermal mismatch stress, it is desirable to have both the cathode and anode materials of a SOFC have a CTE that is as close as possible to the CTE of the electrolyte, which is typically made of yttria-stabilized zirconia (YSZ). A typical CTE of YSZ generally is in a range of between about $10.5 \times 10^{-6\circ}$ $C.^{-1}$ and $11 \times 10^{-6\circ}$ $C.^{-1}$, which is much lower than the CTE of most cathodes. Specifically, while a typical anode material has a CTE of $11.3 \times 10^{-6\circ}$ $C.^{-1}$, the most commonly used cathode material for SOFCs is lanthanum strontium manganite (LSM), $La_{0.8}Sr_{0.2}MnO_3$ (LSM20/80), which has a CTE in a range of between about $12.2 \times 10^{-6\circ}$ $C.^{-1}$ and about $12.4 \times 10^{-6\circ}$ $C.^{-1}$ (average CTE between room temperature and 1200° C.). See L. Kindermann, et al., *Synthesis and properties of La—Sr—Mn—Fe—O perovskites*, Proceedings of the $3^{rd}$ European solid oxide fuel cell forum, 1998, pp. 123. The difference between the CTEs of the LSM and YSZ materials would generate a large thermal mismatch stress in the SOFC. With a Sr content increase above 0.2, the CTE of the LSM material would further increase. Id. On the other hand, it is often undesirable to use an LSM with Sr content lower than 0.2, due to diminished electrochemical performance.

Therefore, there is a need to overcome or minimize the above-mentioned problems.

SUMMARY

The invention generally is directed to a cathode having an anisotropic CTE and a method for forming the anisotropic CTE cathode of a solid oxide fuel cell.

In one embodiment, a cathode of a solid oxide fuel cell includes a sintered layer having an anisotropic coefficient of thermal expansion (CTE) defined by an out-of-plane CTE and an in-plane CTE with a difference of at least $1 \times 10^{-6\circ}$ $C.^{-1}$ between the out-of-plane CTE and the in-plane CTE. The sintered layer can be a perovskite. In some embodiments, the perovskite can be lanthanum strontium manganite (LSM). In these specific embodiments, the LSM can have an in-plane CTE in a range of between about $10.6 \times 10^{-6\circ}$ $C.^{-1}$ and about $11.8 \times 10^{-6\circ}$ $C.^{-1}$, preferably in a range of between about $11.0 \times 10^{-6\circ}$ $C.^{-1}$ and about $11.4 \times 10^{-6\circ}$ $C.^{-1}$. In some embodiments, the out-of-plane CTE of the LSM can be about $13.0 \times 10^{-6\circ}$ $C.^{-1}$ and the in-plane CTE of the LSM is about $12.0 \times 10^{-6\circ}$ $C.^{-1}$. In other embodiments, the out-of-plane CTE of the LSM can be about $14.0 \times 10^{-6\circ}$ $C.^{-1}$ and the in-plane CTE of the LSM is about $10.6 \times 10^{-6\circ}$ $C.^{-1}$. The anisotropic CTE cathode can exhibit a non-linear stress-strain curve at a temperature in a range of between about 20° C. and about 50° C.

In another embodiment, a method for forming a low coefficient of thermal expansion (CTE) cathode of a solid oxide fuel cell includes the steps of placing a layer of perovskite powder between two platens, and sintering the layer while applying pressure to the platens, thereby forming the anisotropic CTE cathode. The layer can have a thickness in a range of between about 0.5 mm and about 4 mm. In some embodiments, the layer can be sintered at a temperature in a range of between about 1200° C. and about 1400° C. for a time period in a range of between about 15 minutes and about 3 hours. In certain embodiments, the layer can be sintered at a temperature in a range of between about 1270° C. and about 1290° C. for a time period in a range of between 15 minutes and about one hour. The pressure applied to the platens can be in a range of between about 0.02 MPa and about 20 MPa. In some embodiments, the pressure applied onto the platens is in a range of between about 0.02 MPa and about 12 MPa.

This invention has many advantages, including maintaining low thermal mismatch stresses in the cell and stack of a SOFC. As will be further described below, it has been found that compression of LSM during heat treatment lowers the CTE of the LSM, thereby minimizing or significantly reducing failure of SOFCs that employ LSM during use.

DETAILED DESCRIPTION

Figure 1:
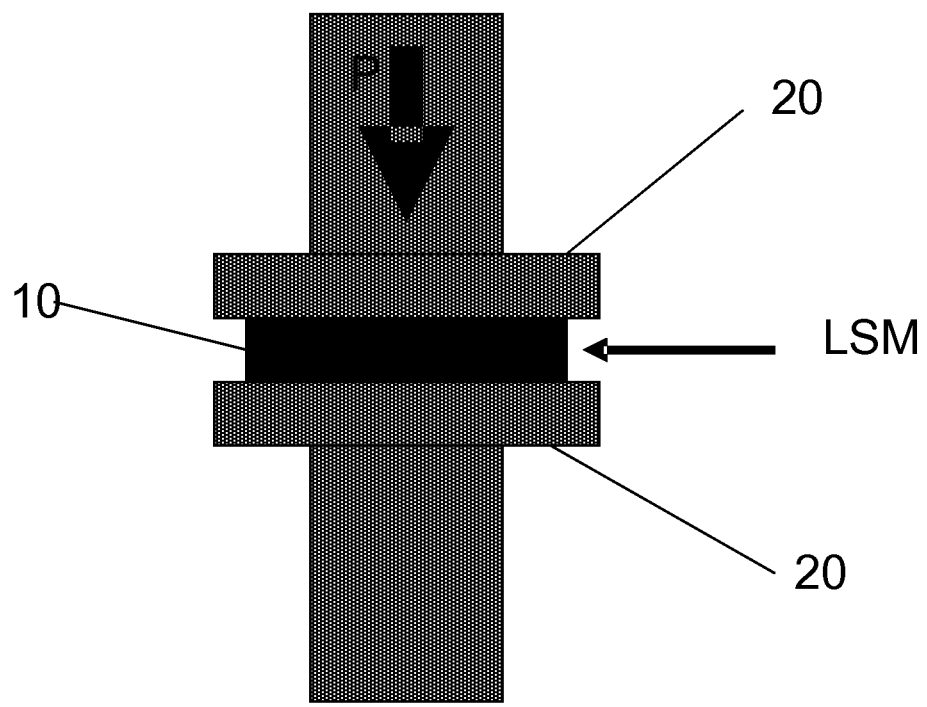
FIG. 1 is a schematic illustration of the application of the methods of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention. The teachings of all patents, published applications and references cited herein are incorporated by reference in their entirety.

The invention generally is directed to a cathode having an anisotropic CTE and a method for forming the anisotropic CTE cathode of a solid oxide fuel cell. A SOFC stack can include the anisotropic CTE cathode, wherein the anisotropic CTE cathode can be made separately before stack fabrication or processed simultaneously with other layers of the SOFC stack. As used herein, the term solid oxide fuel cell includes a solid oxide electrolyser, that is, a solid oxide fuel cell operated in a regenerative mode for the electrolysis of water.

In one embodiment, illustrated in FIG. 1, a method for forming an anisotropic coefficient of thermal expansion (CTE) cathode of a solid oxide fuel cell includes the steps of placing layer 10 of perovskite powder between two platens 20, and sintering the layer while applying pressure to platens 20, thereby forming the anisotropic CTE cathode. The perovskite can be lanthanum strontium manganite (LSM). Other perovskites and their CTE's are listed in Table 1.

Layer 10 can have a thickness in a range of between about 0.5 mm and about 4 mm. Layer 10 can be green-formed from the perovskite powder by, for example, die pressing, tape casting/lamination, extrusion, and gel casting.

TABLE 1

Examples of perovskites and their CTE's

| Material Family | Example | Typical CTE value ($\times 10^{-6}$ °C.$^{-1}$) |
|---|---|---|
| Lanthanum Calcium Manganite (LCM) | $(La_{0.8}Ca_{0.2})MnO_3$ | 11.1 (150° C.- 900° C.) |
| Cerium Magnesium Doped Lanthanum Calcium Manganite (LCCMM) | $(La_{0.69}Ca_{0.2}Ce_{0.11})_{0.99}(Mn_{0.91}Mg_{0.09})O_3$ | 11.2 (150° C.- 900° C.) |
| Lanthanum Strontium Ferrite | $(La_{0.8}Sr_{0.2})FeO_{3-\delta}$ | 10.0-11.8 (20° C.- 1000° C.) |
| Cobalt doped Lanthanum Strontium Ferrite | $(La_{0.6}Sr_{0.4})(Co_{0.2}Fe_{0.8})O_{3-\delta}$ | 15 (300° C.- 700° C.) |

In some embodiments, layer 10 can be sintered at a temperature in a range of between about 1200° C. and about 1400° C., preferably between about 1270° C. and about 1290° C., for a time period in a range of between about 15 minutes and about 3 hours, preferably in a range of between about 15 minutes and about one hour. The pressure applied to platens 20 can be in a range of between about 0.02 MPa and about 20 MPa, preferably in a range of between about 0.02 MPa and about 12 MPa, with a constant pressure being applied to platens 20 during the sintering time period.

The resulting low CTE cathode can have a CTE in a range of between about $10.6 \times 10^{-6}$ °C.$^{-1}$ and about $11.8 \times 10^{-6}$ °C.$^{-1}$, preferably in a range of between about $11.0 \times 10^{-6}$ °C.$^{-1}$ and about $11.4 \times 10^{-6}$ °C.$^{-}$. The CTEs listed herein are linear secant CTEs between room temperature and about 900° C., to avoid complications from continued sintering above about 1000° C.

Figure 4:
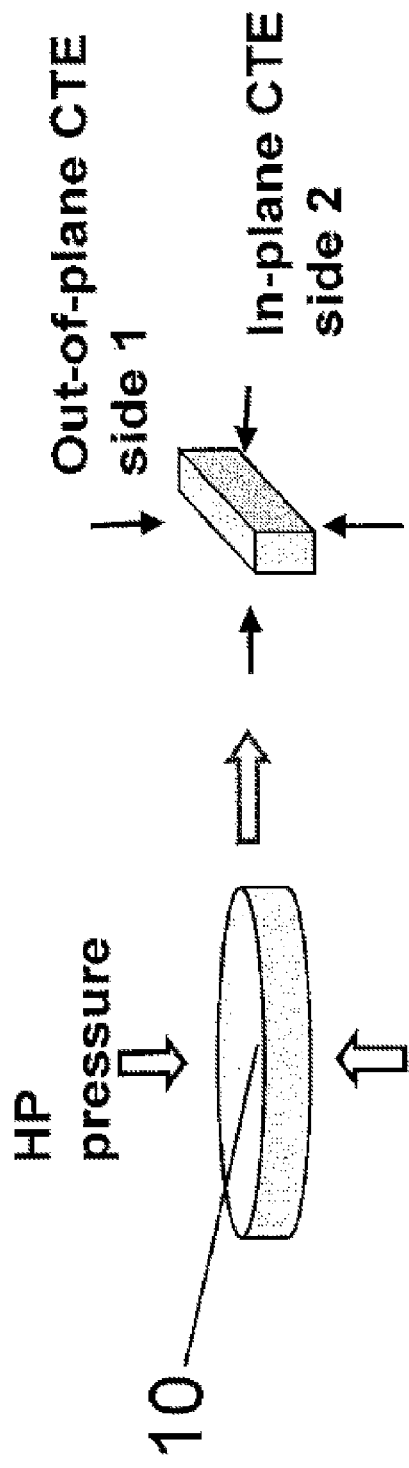
FIG. 4 is a schematic illustration of test samples for the CTE anisotropy tests.

The CTE can be anisotropic. As illustrated in FIG. 4, the CTE can be defined by an out-of-plane CTE and an in-plane CTE. The out-of-plane CTE of the low CTE cathode can be about $14.0 \times 10^{-6}$ °C.$^{-1}$ and the in-plane CTE of the low CTE cathode can be about $10.6 \times 10^{-6}$ °C.$^{-1}$. Without wishing to be bound by any particular theory, it is suggested that the pressure induced change in CTE can be caused by the creation of anisotropy. Single crystalline LSM has different thermal expansion coefficients along its three axes. See Neumeier, J. J. et al., 1999, *Thermal expansion of single-crystalline $La_{0.83}Sr_{0.17}MnO_3$: the importance of temperature-induced strain for electrical resistivity*, Physical review B, vol. 58, No. 3, 1701-1705, for the CTE of single-crystalline $La_{0.83}Sr_{0.17}MnO_3$ along its a, b, and c axes, but only below room temperature (RT). The literature results show that the single crystalline LSM has anisotropic CTE. The temperature dependent crystal lattice parameters can be found in the literature. Gaviko, et al., 2005, *X-ray studies of the (La,Sr)$MnO_3$ perovskite manganite structure*, Physics of the solid state, Vol 47, No. 7, 1299-1305; Iberl, A, et al., 1991, *High-temperature x-ray diffraction measurements of phase transitions and thermal expansion in(La,Sr)(Mn,Co)O_3-cathode materials*, Proceedings of the 2$^{nd}$ international symposium on solid oxide fuel cells, 527-535. The macroscopic CTE is the average of random distribution of the anisotropic single-crystalline LSM that appears isotropic macroscopically. It is possible that pressure applied at high temperature disturbs the statistically random orientation of crystalline LSM, thus generating anisotropy.

The cathode can exhibit a non-linear stress-strain curve at a temperature in a range of between about 20° C. and about 50° C.

Exemplification

Figure 6:
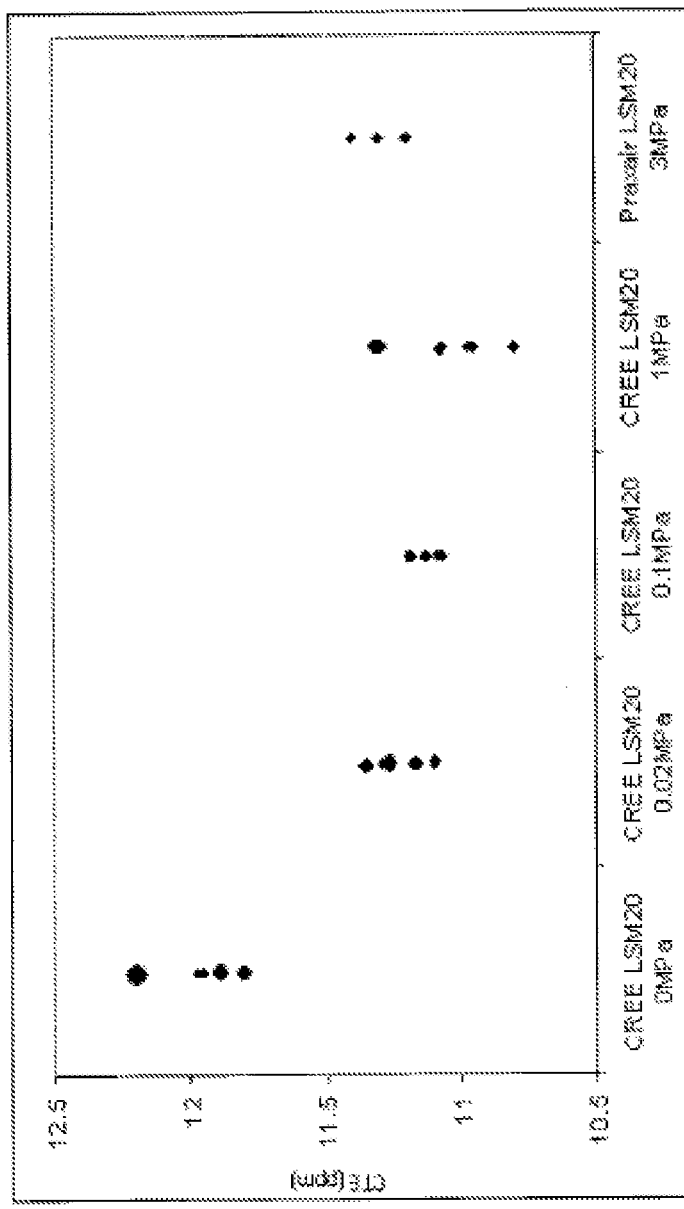
FIG. 6 is a graph of CTE as a function of pressure.

All samples were sintered at about 1280° C. for about 30 minutes in air unless otherwise noted. For the hot-pressed (HPed) samples whose results are shown in FIG. 6 and Table 7 below, a constant pressure in a range of between about 0.02 MPa and about 3 MPa was maintained throughout the sintering step. Table 2 below lists the CTEs measured from room temperature (RT) to 900° C. of several LSM materials (in ppm, i.e $10^{-6}$ °C.$^{-1}$) from Praxair (Praxair, Woodinville, Wash.) $La_{0.8}Sr_{0.2}MnO_3$ (LSM20), Praxair LSM20 with 0%, 2%, and 5% A-site deficiency, LSM20 produced in-house (CREE LSM20) either free-sintered or bisque-fired, and NexTech (NexTech Materials, Lewis Center, Ohio) LSM20. Unless noted otherwise, the samples listed in Table 2 were produced by free-sintering the green-formed corresponding LSM powder in air.

TABLE 2

CTE (RT-900° C.) of free-sintered LSM20

| Materials | CTE (ppm) | Materials | CTE (ppm) |
|---|---|---|---|
| CREE LSM20 (CB0616 free-sintered) | 11.9-12 | Praxair LSM20 2% A-site | 12-12.2 |
| CREE LSM20 (CB0704 free-sintered) | 12-12.2 | Praxair LSM20 5% A-site | 12.1 |
| CREE LSM20 (CB0704 bisque-fired) | 12.1-12.2 | Praxair LSM20 (0% A-site) | 12 |
|  |  | Nextech LSM20 | 11.9-12.1 |

Figure 2:
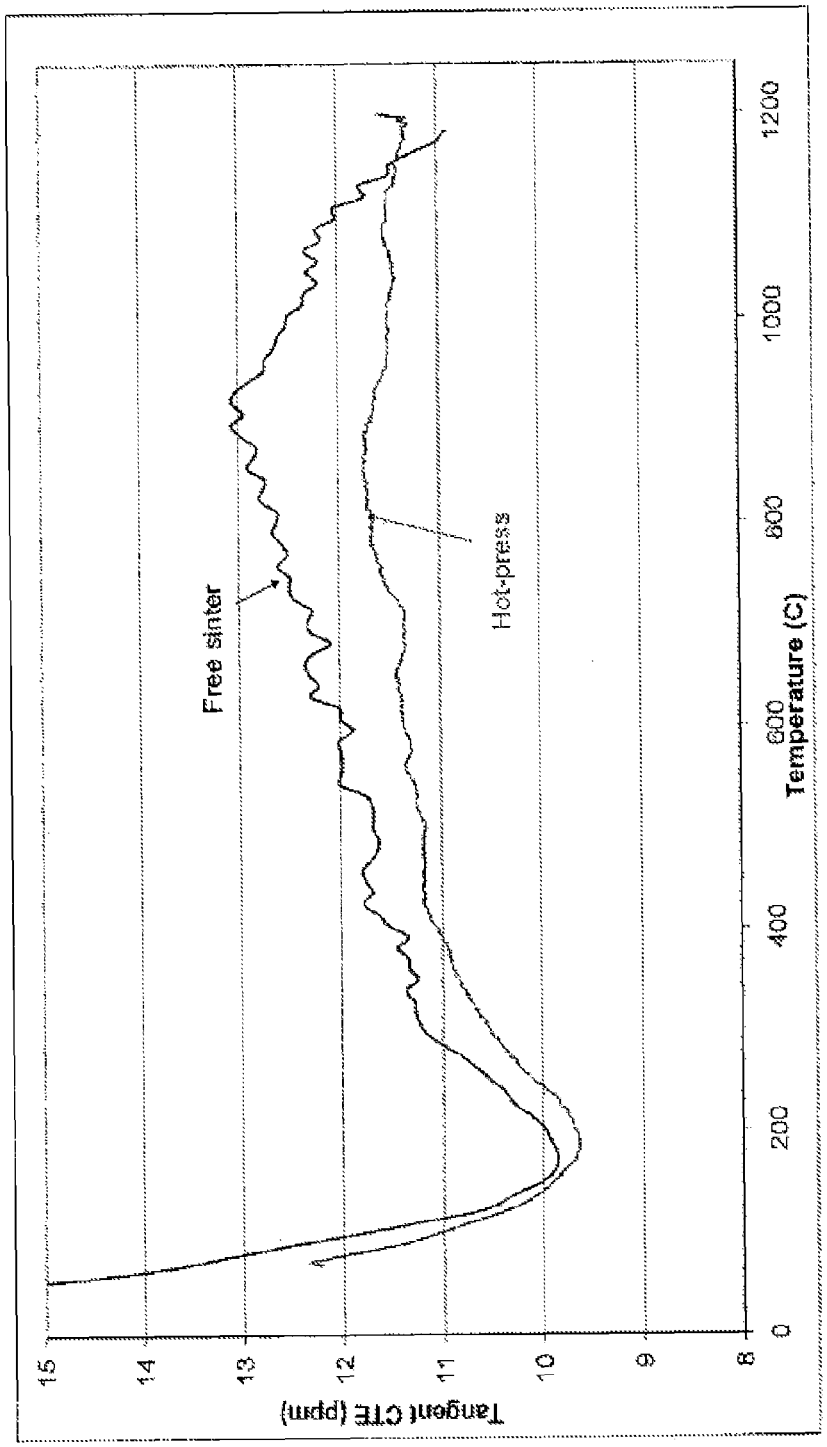
FIG. 2 is a graph of tangent CTE as a function of temperature for free-sintered and hot-pressed CREE LSM20.

To demonstrate the effect of hot-pressing the LSM samples, three sets of samples were made from the same batch of CREE LSM20. Set A was free-sintered in a box oven with a spacer covering the top and bottom surfaces. Set B was free-sintered in a hot-press oven with a sapphire spacer covering the top and bottom surfaces, and Set C was hot-pressed. Each set of samples consisted of at least 4 samples and two rounds of repeated tests. The CTE results were:

Set A (free-sintered in box oven, covered by spacer)—12-12.2 ppm
Set B (free-sintered in hot-press oven, covered by spacer)—11.9-12.2 ppm
Set C (hot-pressed)—11-11.2 ppm A comparison of differential CTEs between hot-pressed and free sintered CREE LSM20 powder is shown in FIG. 2. As shown in FIG. 2, the hot-pressed LSM20's tangent CTE is lower than that of free-sintered LSM20 over the entire temperature range.

Additional results for low CTE LSM were obtained from a series of pre-sintered (bisque-fired) cathode bulk samples. Three sets of identical 1 inch (25 mm) disks were first free-sintered. Two of them were then hot-pressed under different temperatures and pressures, listed in Table 3 below. Their CTEs, also listed in Table 3, were measured afterwards. As shown in Table 3, hot-pressing lowered the CTE of the LSM material.

TABLE 3

Bisque-fired LSM20 CTE

| Sample | Bisque Condition | Hot-press condition | CTE (RT-900° C., ppm) |
|---|---|---|---|
| 1 | 1350° C. | N/A | 12.1-12.2 |
| 2 | 1350° C. | 1320° C./7 MPa | 11.3-11.5 |
| 3 | 1350° C. | 1280° C./10 MPa | 11.1-11.4 |

An additional sample made from Praxair LSM20 and calcined before hot-pressing also showed a low CTE after hot-pressing.

Thermal Stability Results

Hot-pressed CREE LSM20 was subjected to thermal cycle tests in which the samples were exposed to 900° C. for an accumulated time period of about 16 hours. The CTE before the cyclic test (during the initial heat-up) and after the test (during final cycle cool-down) were calculated. The two CTE values were the same for all three types of samples tested (11-11.2 ppm for hot-pressed CREE LSM20, 11.9-12.2 ppm for free-sintered Praxair LSM20 and free-sintered CREE LSM20). Therefore, the relatively short-term stability of the CTE is demonstrated at 900° C.

Annealing Results

A set of hot-pressed CREE LSM20 were annealed in a dilatometer in air at 900° C. (4 hrs), 1200° C. (4 hrs), 1280° C. (6 hrs), and 1380° C. (2 hrs) respectively. The CTEs before and after annealing were measured. Pre-annealing CTE was measured during the heat-up phase of annealing. Post-annealing CTE was measured both during cool-down phase of annealing and in at least one subsequent separate CTE measurement run. The results are shown in Table 4 below.

TABLE 4

CTE results for annealed hot-pressed CREE LSM20

| Sample | Anneal Condition | Pre-annealing CTE (ppm) | Post-annealing CTE (ppm) |
|---|---|---|---|
| 1 | 900° C./4 hrs | 11.2 | 11.2 |
| 2 | 1200° C./4 hrs | 11.3 | 11.4 |
| 3 | 1280° C./6 hrs | 11.3 | 11.9 |
| 4 | 1380° C./2 hrs | 11.3 | 12.1 |

Figure 3:
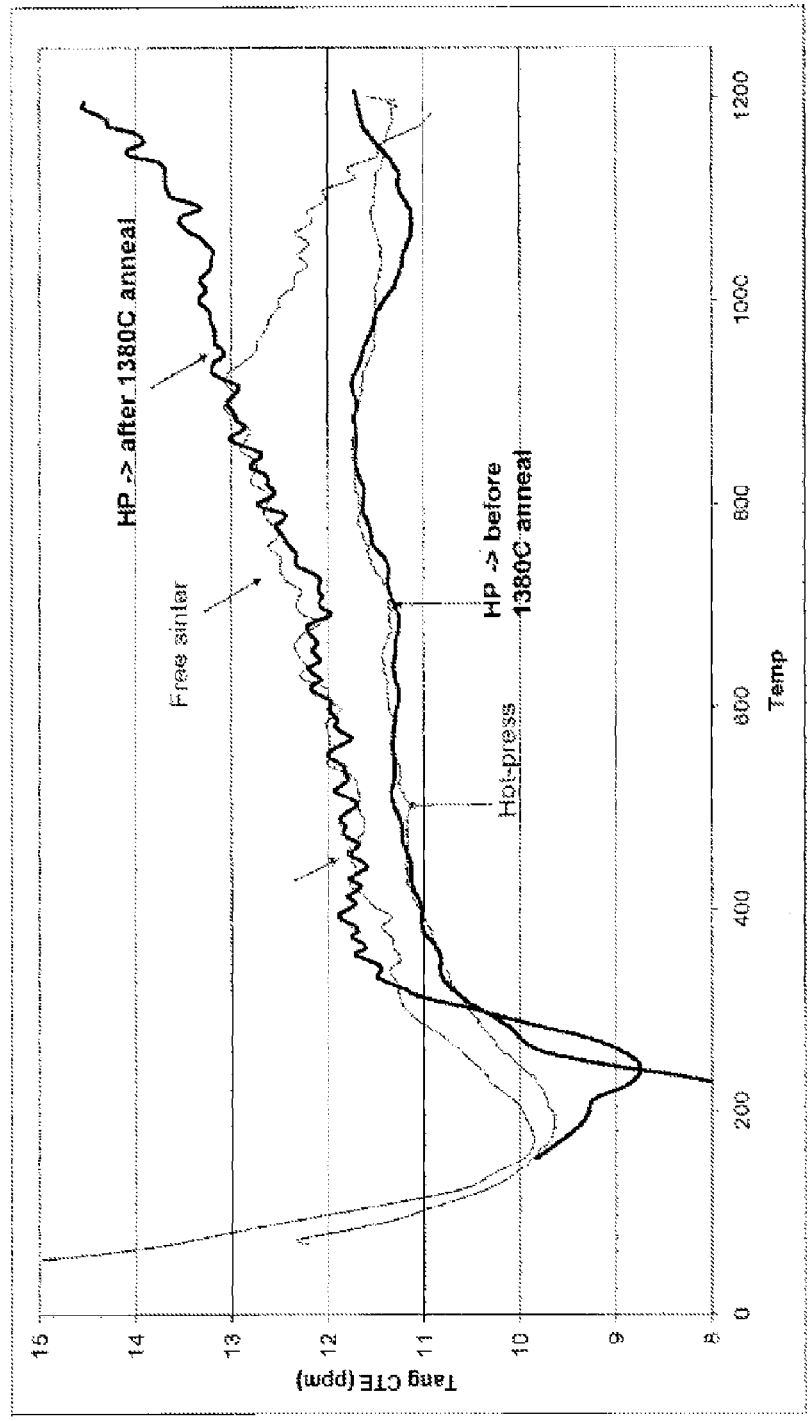
FIG. 3 is a graph of tangent CTE pre- and post-annealing compared to the CTE of free-sintered and hot-pressed LSM20.

The CTE remained unchanged after annealing at and below 1200° C., but increased back to (or almost to) the CTE of free-sintered LSM20 after annealing above 1200° C. The trend can also be seen from the differential CTE plot shown in FIG. 3.

The annealing study was also done with the pre-sintered (bisque-fired) samples. The results are listed in Table 5 below.

TABLE 5

CTE results for pre-sintered (bisque-fired) LSM20

| Sample | Bisque-fire condition | Anneal Condition | Pre-anneal CTE (ppm) | Post-anneal CTE (ppm) |
|---|---|---|---|---|
| 1 | Bisque-fire 1350° C. | 1280° C. 6 hrs | 12.1 | 11.9 |
| 2 | Bisque-fire 1350° C. –> Hot-press 1320° C. + 7 MPa | 1280° C. 6 hrs | 11.3 | 12 |
| 3 | Bisque-fire 1350° C. –> Hot-press 1280° C. + 10 MPa | 1280° C. 6 hrs | 11.4 | 12 |

As shown by the results in Table 5, the low CTE of the LSM obtained after hot-pressing reverses back to the CTE of free-sintered LSM after annealing at or above 1280° C. Without wishing to be bound by any particular theory, it is possible that the CTE reversal might be activated by the mobility of the crystalline structure, similarly to the continued sintering observed in hot-pressed LSM20 above 1100° C.

Anisotropy Results

The CTE of hot-pressed LSM20 was tested in two orthogonal directions, shown in FIG. 4. Due to the limitation of hot-pressed disk thickness (4 mm), the test samples were much shorter than the typical dilatometer test sample length (25 mm). The dimensions of the anisotropy test samples were 4 mm×4 mm×4 mm.

Figure 5:
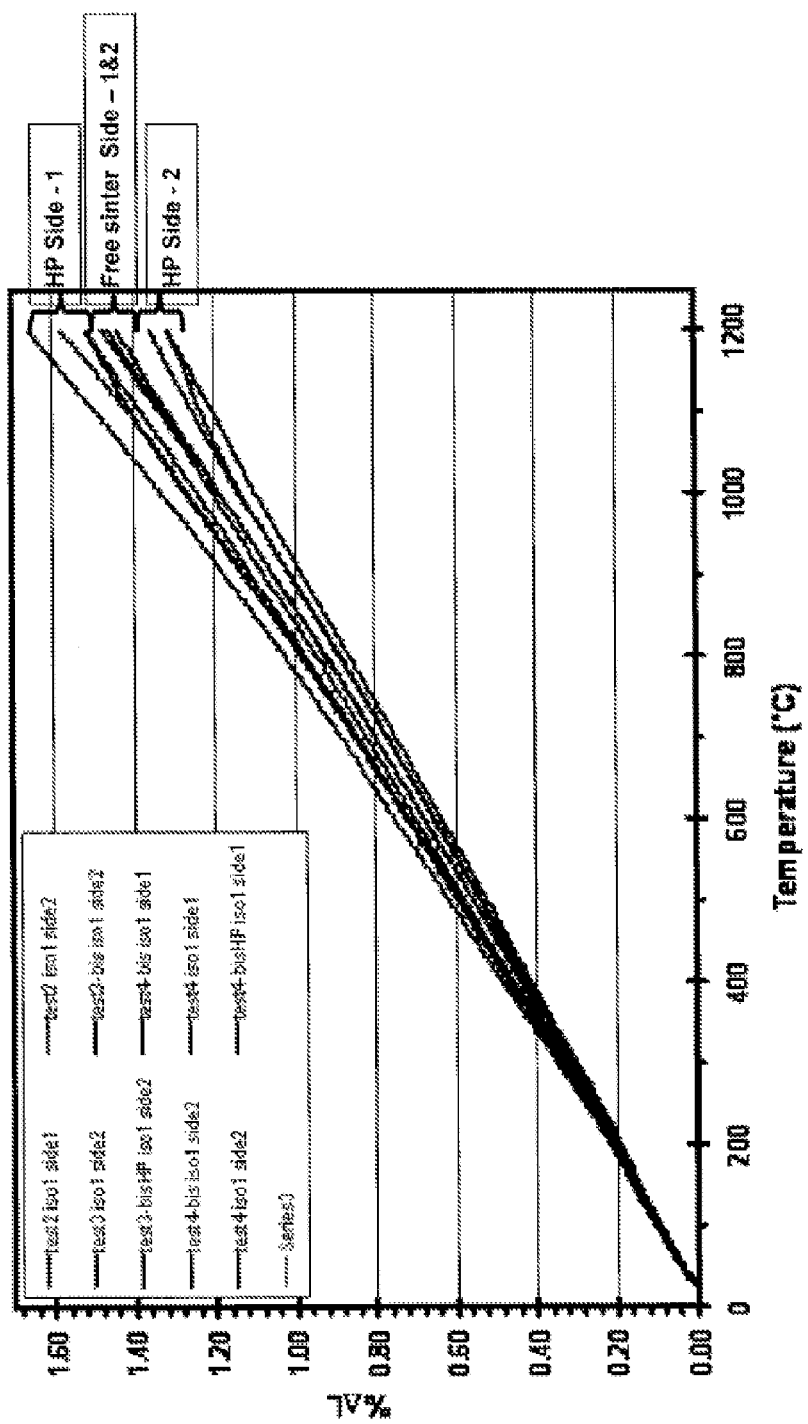
FIG. 5 is a graph of the anisotropic CTE test results

Four sets of tests were done, with 32 expansion curves recorded, 16 curves for each orientation. The test samples were cut from the usual long dilatometer test bar (25 mm long). The materials included free-sintered, hot-pressed, bisque-fired, and bisque-fired/hot-pressed CREE LSM20. Measurements (expansion curves) are shown in FIG. 5. Turning to FIG. 5, the measurements in the out-of-plane direction (along the pressure direction) are identified as HP Side 1, and the measurements in the in-plane direction (perpendicular to the pressure direction) are identified as HP Side 2. The measurements of free-sintered samples are identified as Free Sinter Side-1&2. The small sample length in this test led to large variations in the results. Although not conclusive, the plot suggests that anisotropy existed in the hot-pressed samples with the out-of-plane direction CTE of about 13 ppm, and the in-plane direction CTE of about 11 ppm. The free-sintered samples had a CTE of about 12 ppm.

In another example, a thicker (23 mm) sample was made with a sintering temperature of about 1320° C. and a time of about 30 min under a pressure of about 3 MPa, so that longer (21 mm) CTE bars could be made for measurements along both in-plane and out-of-plane directions. Table 6 shows the CTE values of 3 in-plane and out-of-plane samples, respectively, showing the anisotropy behavior of the samples. The CTE values along the in-plane direction listed in Table 6 are higher than those reported elsewhere. However, the HPed sample used for measurements in Table 6 was much thicker than the regular ones discussed above (23 mm vs.≤4 mm) Without wishing to be bound by any particular theory, it is reasonable to suggest that within the thick sample the transition of pressure and the correspondent mass diffusion can be different from those within a thin sample. This difference might cause different CTE results, but the anisotropic behavior remained true for both types of samples regardless of thickness.

TABLE 6

CTE values (ppm) of in-plane and out-of-plane directions measured on a 23 mm thick HPed sample

| Measurement | #1 | #2 | #3 |
|---|---|---|---|
| In-plane direction | 11.9 | 11.6 | 12.0 |
| Out-of-plane direction | 13.0 | 12.6 | 13.0 |

Figure 8:
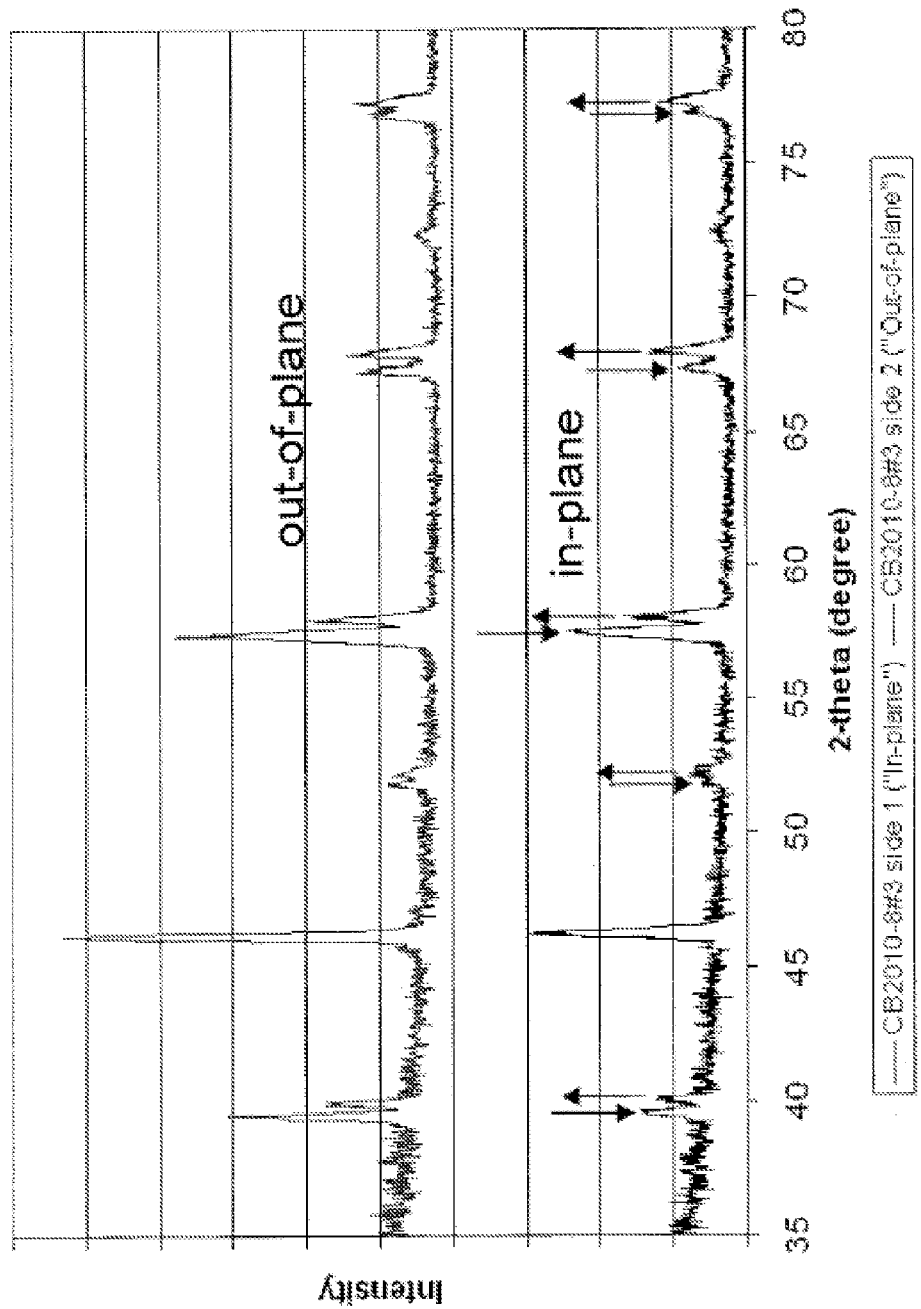
FIG. 8 is a graph of an XRD pattern of in-plane and out-of-plane surfaces of a hot-pressed sample.

X-ray diffraction (XRD) characterization was applied on the in-plane and out-of-plane surfaces of HPed samples. As shown in FIG. 8, crystal anisotropy can be differentiated by XRD characterization on the in-plane and out-of-plane surfaces. The number of peaks and position of those peaks are identical for both orientations. However, there are five pairs of peaks showing apparent relative intensity change (Table 7). The index of those "intensity increasing" peaks all have a big number at the c-direction of the crystal lattice index, which suggests the "in-plane" surface preferably aligned with the c-plane of the crystal structure, that is, the in-plane surface shows a preferred crystallographic orientation along the c-plane of the LSM crystal structure. Although this may not be the only reason for the CTE anisotropy seen above, it is expected that this crystal anisotropy can be a significant contributor.

TABLE 7

Relative intensity change of XRD peaks comparing "in-plane" surface against "out-of-plane" surface for HPed LSM samples

| Peaks whose intensity relatively increase | | Peaks whose intensity relatively decrease | |
|---|---|---|---|
| 2θ (degree) | Index | 2θ (degree) | Index |
| 40.48 | 00(0)6 | 40.05 | 20(−2)2 |
| 52.79 | 11(−2)6 | 52.44 | 12(−3)2 |
| 58.50 | 01(−1)8 | 57.85 | 30(−3)0 |
|  |  | 58.01 | 21(−3)4 |
| 68.50 | 20(−2)8 | 67.90 | 22(−4)0 |
| 77.84 | 12(−3)8 | 77.42 | 13(−4)4 |

Hot-Pressing Results with Variable Pressure

The anisotropy results described above strongly indicate that pressure is the cause of low CTE. Hence, a series of samples of CREE LSM20 were hot-pressed, but with different peak pressure: 1 MPa, 0.1 MPa, dead load (~0.02 MPa), and no pressure (but with sapphire spacer covering). For each pressure level, at least two samples were tested and each test consisted of at least two repeated tests done on different weeks. Also tested was a Praxair fine powder LSM20 that was hot-pressed at 3 MPa. The CTE results are listed in Table 8. Also listed in Table 8 is the diameter expansion of the sample disk after hot-press—to indicate whether deformation has been caused by the pressure. The sample should shrink in diameter during sintering, but if enough pressure was applied to cause deformation (pressure induced mass diffusion), the diameter of the disk could expand.

TABLE 8

CTEs of hot-pressed LSM20 at different pressures

|  | Peak pressure (MPa) | Disk Diameter Expansion by HP | CTE (75 −> 900° C. ppm) | # Samples (Test Repeats) |
|---|---|---|---|---|
| CREE LSM-(J) | 0 (spacer) | −1.2% | 11.9-12.2 | 4 (1) |
| CREE LSM-(E) | 0.02 (dead load) | 0.5% | 11.1-11.3 | 3 (2) |
| CREE LSM-(F) | 0.1 | 1% | 11.1-11.2 | 4 (1) |
| CREE LSM-(G) | 1 | 3% | 10.9-11.1 | 3 (2) |
| Praxair LSM20 | 3 |  | 11.2-11.4 | 4 (2) |

As demonstrated by the results shown in Table 8 and FIG. 6, the hot-press pressure indeed has caused the low CTE of LSM20 after hot-press. FIG. 6 shows the CTE values for each individual test sample. It can be seen that even 0.02 MPa pressure was enough to alter the material. From the disk diameter expansion results, it can be seen that even 0.02 MPa pressure is large enough to induce pressure induced deformation (mass diffusion). This observation correlates with the hypothesis above on the creation of anisotropy in the crystalline structure by the forced alignment of crystalline orientation. It could also correlate with the observation above on the temperature at which (above 1200° C.) the CTE can be reversed after annealing.

To underscore the effect of even relatively low pressure, all 5 batches of tests results, for which samples were cut from the same disk for each pressure level, for CR LSM-(E) (0.02 MPa) and CR LSM-(G) (0.1 MPa) are given in Table 9 below. The samples were deliberately alternated as to which slot in the dilatometer was used for the test. The tests were conducted over a time span of two months.

TABLE 9

Comparison between CTEs from pressures of 0.02 MPa and 0.1 MPa

|  | 1 | 2 | 3 | 4 | 5 |
|---|---|---|---|---|---|
| CREE LSM-(E) 0.02 MPa | 11.3 | 11.3 | 11.35 | 11.1 | 11.2 |
| CREE LSM-(G) 0.1 MPa | 11 | 11 | 11.1 | 11.3 | 10.8 |

Non-Linear Stress-Strain Results

Figure 7A:
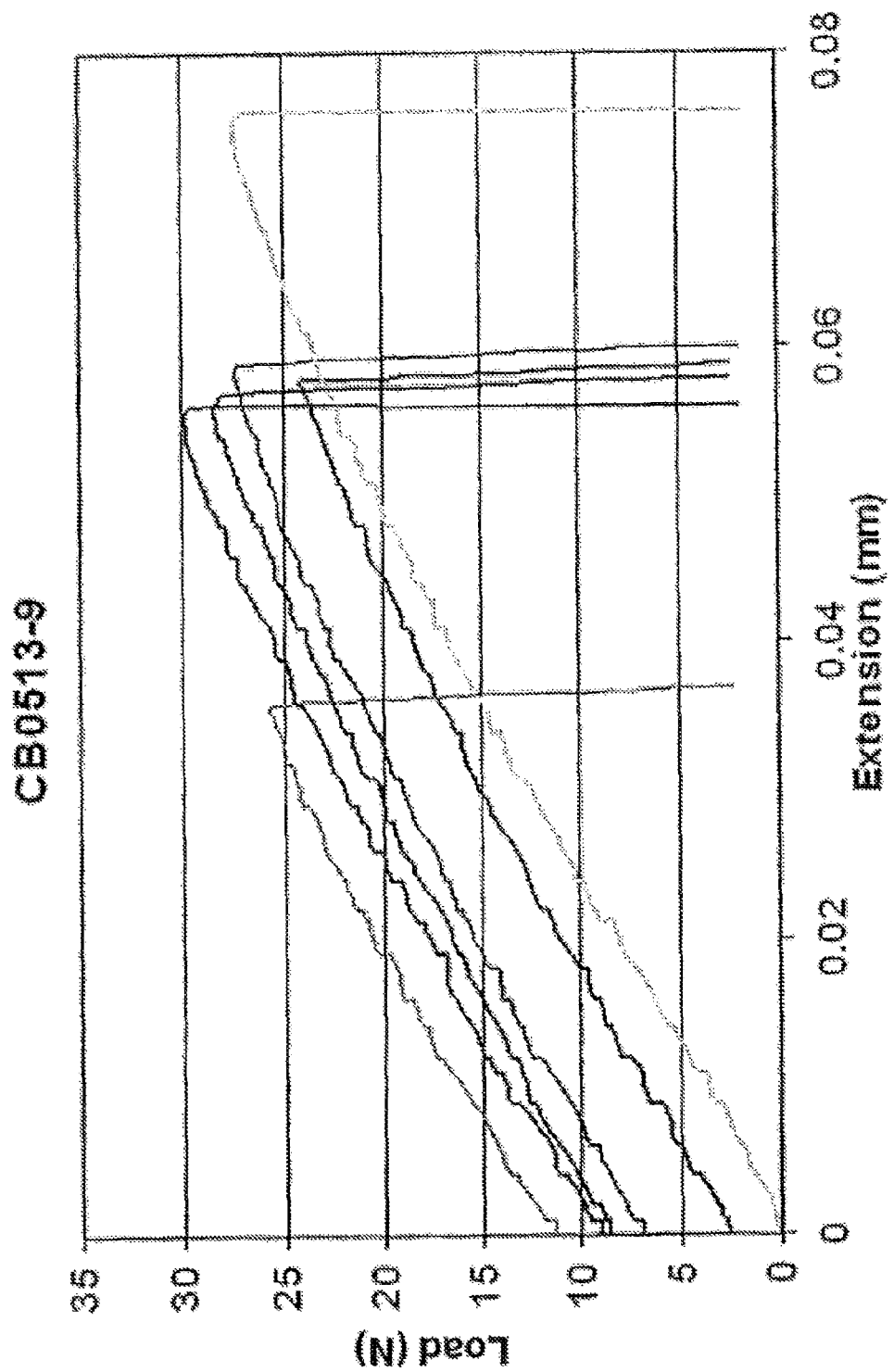
FIGS. 7A-C are graphs of four-point bending load as a function of displacement for cathode bulk materials.
Figure 7B:
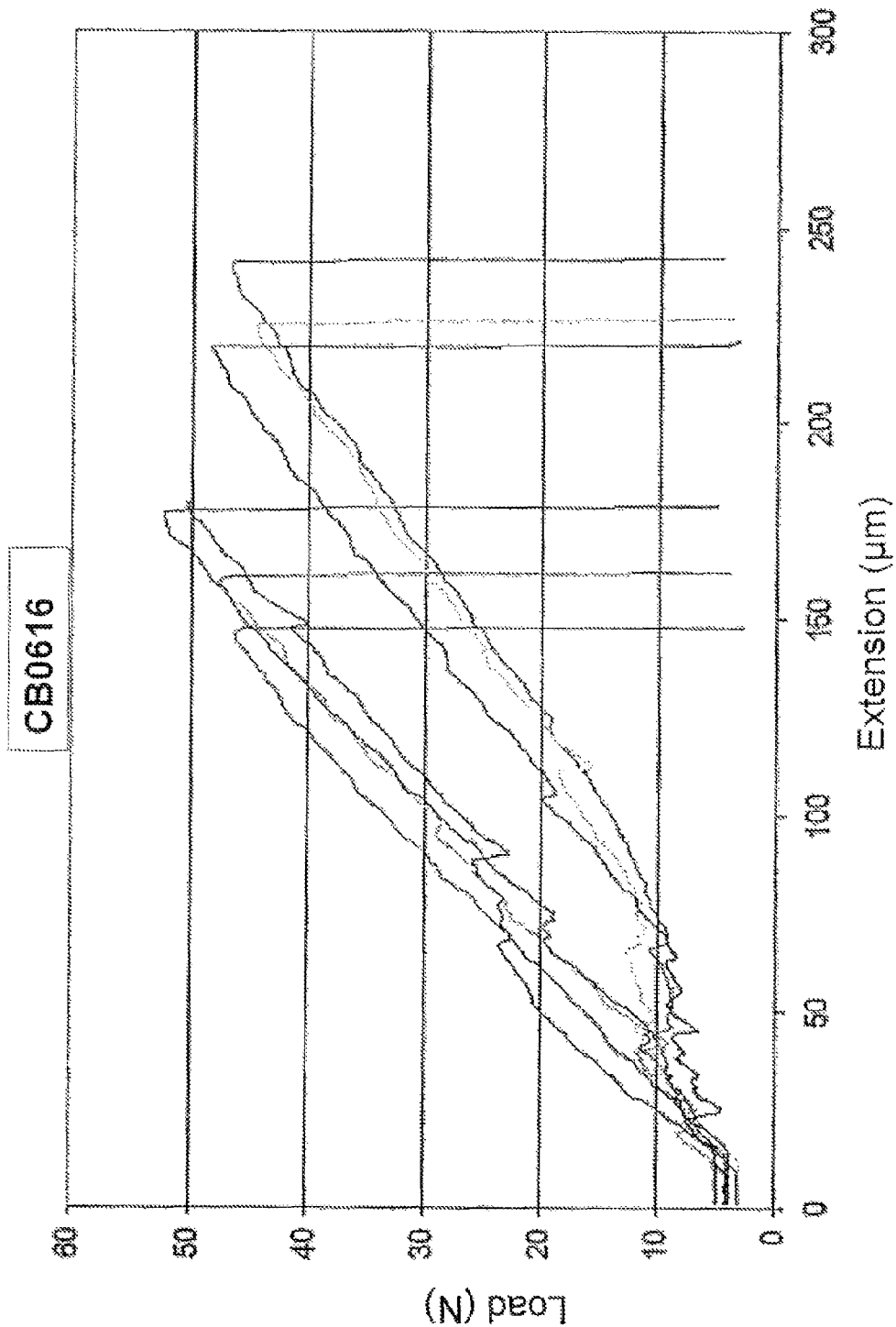
Figure 7C:
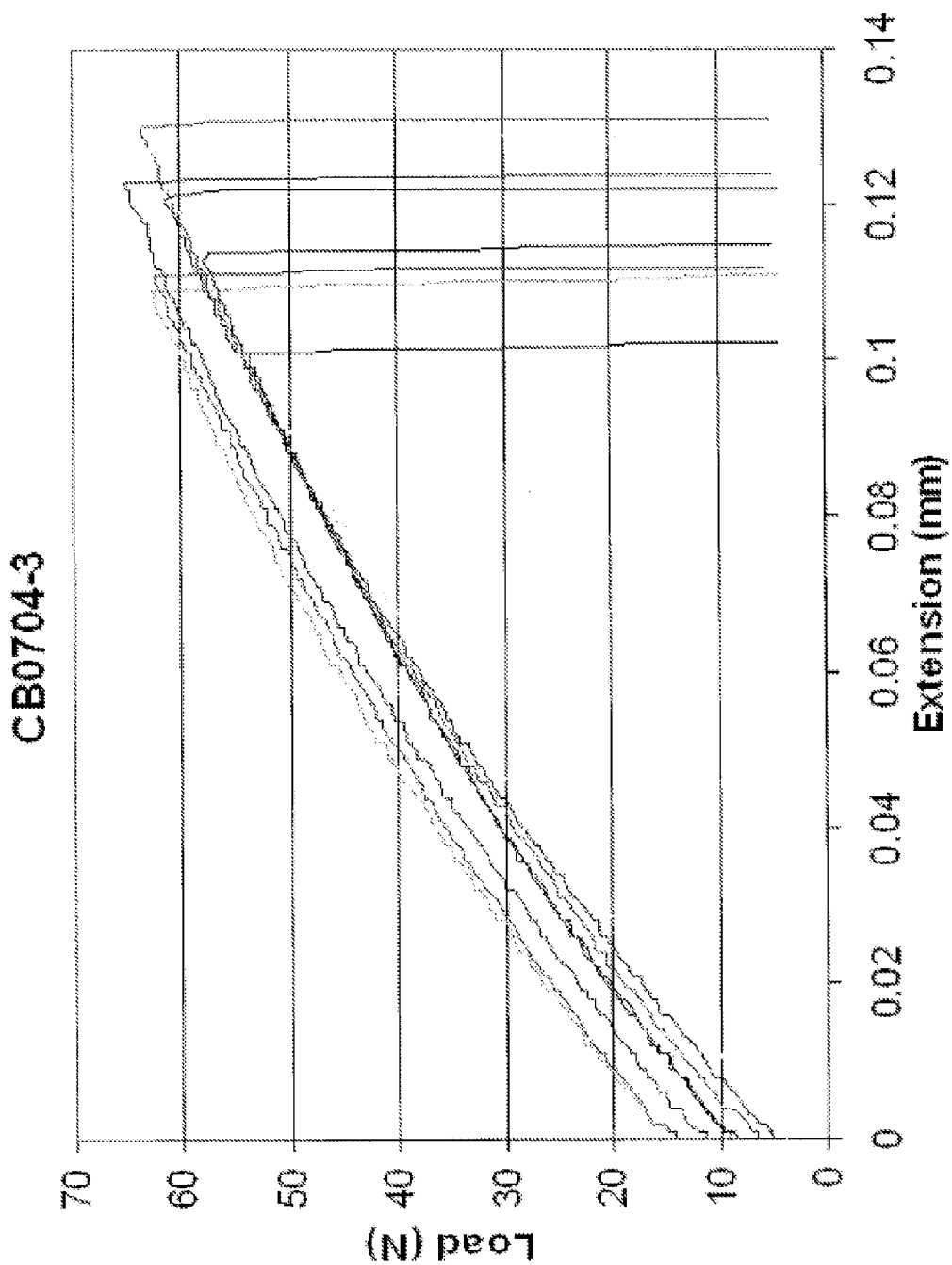

LSM20 powder (CREE LSM20 or Praxair LSM20) was hot-pressed or free sintered into 2 inch disks. Bars were then cut from disks with dimensions of 50 mm×4 mm×4 mm. The bars were then subjected to four-point bending tests to measure the load vs. displacement curves. The results are shown in FIGS. 7A-D. CB0513 was hot-pressed Praxair LSM20 (calcined powder) (FIG. 7A), CB0616 was free sintered CREE LSM20 (FIG. 7B), and CB0704 was hot-pressed CREE SLM20 (FIG. 7C). CB0616 (free-sintered CREE LSM20) showed a linear elastic to failure load-displacement curve under four point bending, which is the expected behavior of ceramics materials at room temperature under small loading. FIGS. 7A-C show the load-displacement curves for each individual sample of the respective composition. Both CB0513 (hot-pressed Praxair LSM20) and CB0704 (hot-pressed CREE LSM20) clearly showed non-linear load vs. displacement curves that are very much like plasticity yielding, i.e., softening, a behavior that resembles the ferroelasticity reported for some perovskite ceramics.

Figure 7D:
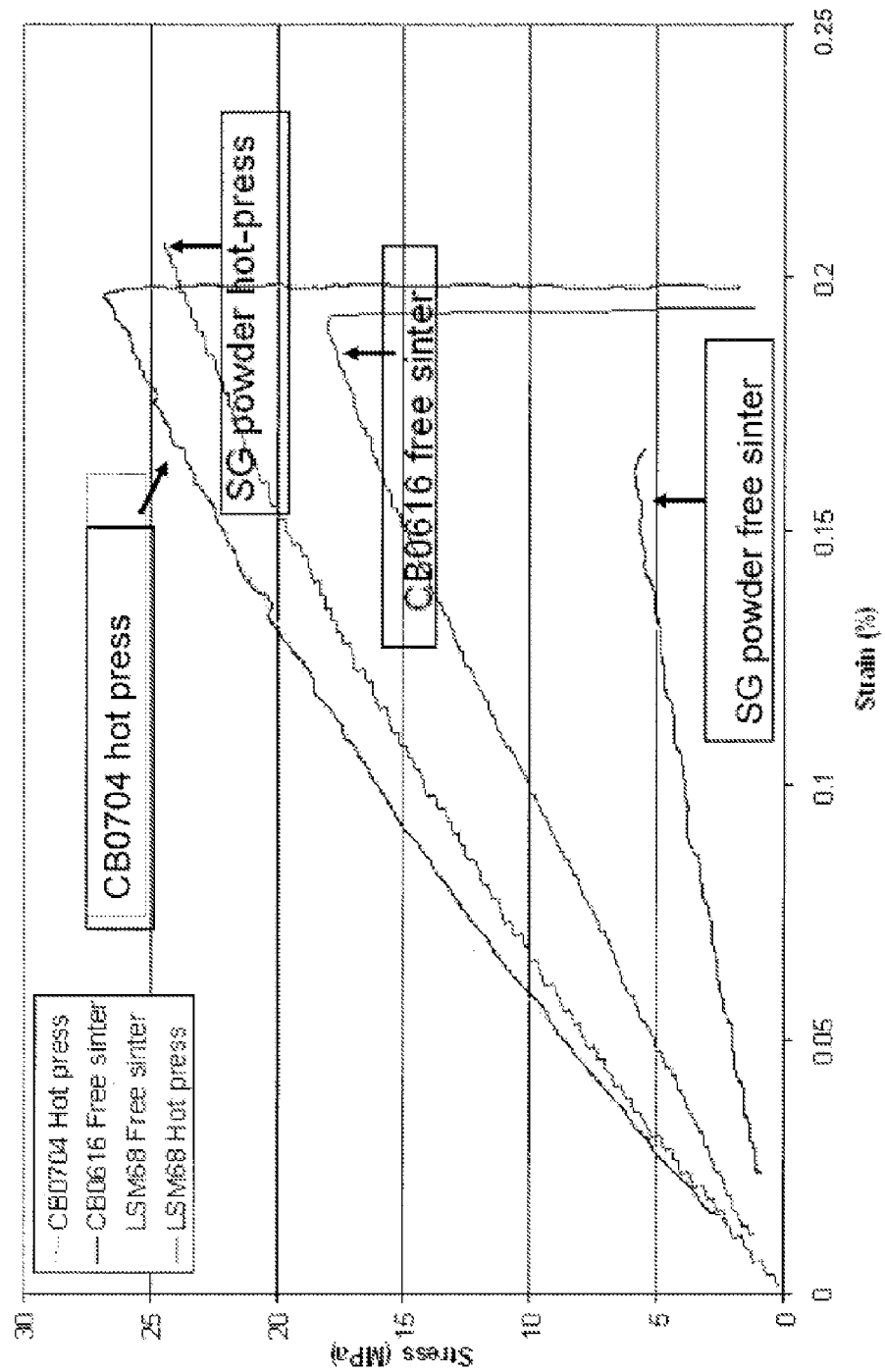
FIG. 7D is a graph of stress as a function of strain for cathode bulk materials.

To verify the effect of hot-press sample preparation, two sets of samples were identically processed with the only difference being that one set was hot-pressed and one set was free-sintered. The powder batch, green forming, and sintering time and temperature were all the same. The result is shown in FIG. 7D. The free sintered sample was shown as linear and the hot-pressed sample had clear non-linear behavior that matched well with the CB0704 samples.

INCORPORATION BY REFERENCE

The teachings of all references identified above are incorporated herein by reference in their entirety.

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:

1. A method of forming a portion of a solid oxide fuel cell article, the method comprising:
   forming a cathode consisting essentially of lanthanum strontium manganite (LSM), wherein forming the cathode includes performing a pressure sintering operation on a single, unattached layer; and
   after performing the pressure sintering operation, annealing the cathode to alter a coefficient of thermal expansion (CTE) of the cathode.

2. The method of claim 1, wherein the LSM has a composition of $La_{1-x}Sr_xMnO_3$, and wherein x is about 0.2.

3. The method of claim 1, wherein, prior to the pressure sintering operation, the CTE of the cathode between room temperature and about 900° C. is in a range of between about $11.9 \times 10^{-6}$ °C.$^{-1}$ and about $12.2 \times 10^{-6}$ °C.$^{-1}$.

4. The method of claim 1, wherein the pressure sintering operation is performed at a temperature in a range of between about 1200° C. and about 1400° C.

5. The method of claim 4, wherein the pressure sintering operation is performed for a time period in a range of between about 15 minutes and about 3 hours.

6. The method of claim 4, wherein the pressure sintering operation is performed at a temperature in a range of between about 1270° C. and about 1290° C.

7. The method of claim 6, wherein the pressure sintering operation is performed for a time period in a range of between 15 minutes and about 1 hour.

8. The method of claim 1, wherein the pressure sintering operation is conducted at a pressure range of between about 0.02 MPa and about 20 MPa.

9. The method of claim 1, wherein the pressure sintering operation is conducted at a pressure range of between about 0.02 MPa and about 12 MPa.

10. The method of claim 1, wherein after performing the pressure sintering operation and prior to annealing, the cathode has an anisotropic CTE defined by an out-of-plane CTE and an in-plane CTE with a difference of at least $1 \times 10^{-6}$ °C.$^{-1}$ between the out-of-plane CTE and the in-plane CTE.

11. The method of claim 1, wherein, after performing the pressure sintering operation and prior to annealing, the cathode exhibits non-linear stress-strain behavior at a temperature in a range of between about 20° C. and about 50° C.

12. The method of claim 1, wherein, after performing the pressure sintering operation and prior to annealing, the CTE of the cathode between room temperature and about 900° C. is in a range of between about $10.6 \times 10^{-6}$ °C.$^{-1}$ and about $11.8 \times 10^{-6}$ °C.$^{-1}$.

13. The method of claim 12, wherein the CTE of the cathode between room temperature and about 900° C. is in a range of between about $11.0 \times 10^{-6}$ °C.$^{-1}$ and about $11.4 \times 10^{-6}$ °C.$^{-1}$.

14. The method of claim 1, wherein, after annealing, the CTE of the cathode between room temperature and about 900° C. is not less than $11.9 \times 10^{-6}$ °C.$^{-1}$.

15. The method of claim 14, wherein, after annealing, the CTE of the cathode between room temperature and about 900° C. is not less than $12 \times 10^{-6}$ °C.$^{-1}$.

16. The method of claim 1, wherein annealing is performed at a temperature that is not less than 1200° C.

17. The method of claim 16, wherein annealing is performed at about 1280° C.

18. The method of claim 16, wherein annealing is performed at about 1380° C.

19. The method of claim 1, wherein annealing is performed for a time period of not less than 2 hours.

20. The method of claim 19, wherein annealing is performed for a time period of about 6 hours.

21. The method of claim 1, wherein annealing is performed in an atmosphere comprising air.

* * * * *